Figure 1:
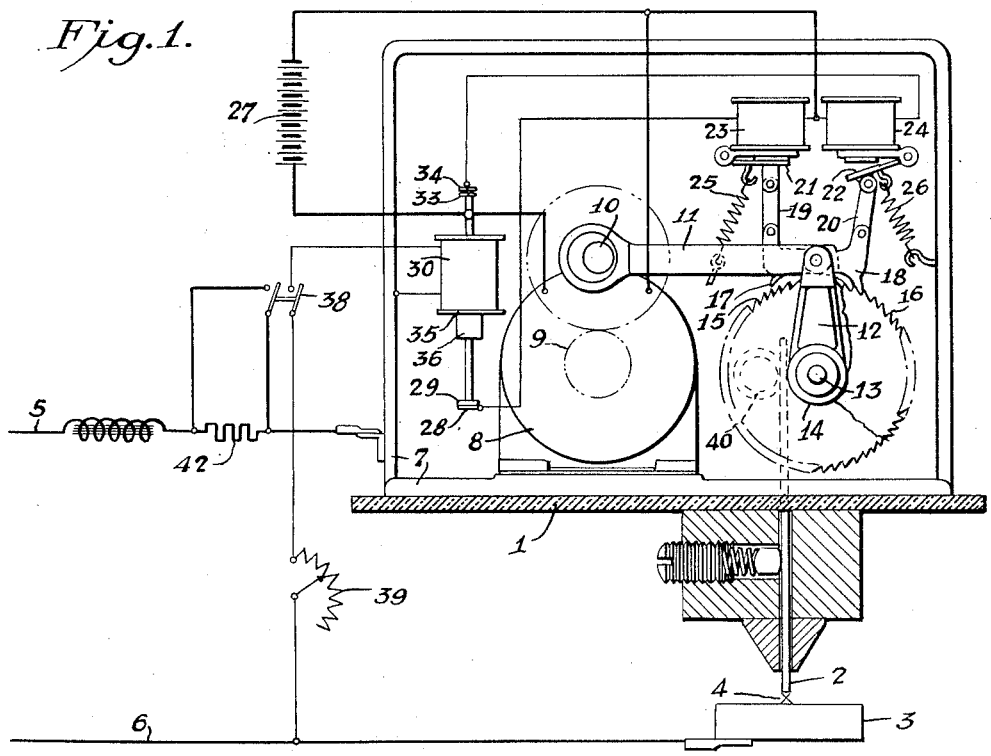

Oct. 30, 1928.

A. M. MacFARLAND 1,689,882

AUTOMATIC WELDING APPARATUS

Filed May 18, 1926

INVENTOR.
Allis M. MacFarland
BY
ATTORNEY.

Patented Oct. 30, 1928.

1,689,882

UNITED STATES PATENT OFFICE.

ALLIS M. MacFARLAND, OF PITTSBURGH, PENNSYLVANIA, ASSIGNOR TO WESTINGHOUSE ELECTRIC & MANUFACTURING COMPANY, A CORPORATION OF PENNSYLVANIA.

AUTOMATIC WELDING APPARATUS.

Application filed May 18, 1926. Serial No. 109,853.

My invention relates to arc welding and particularly to automatic machines wherein means are provided to regulate the rate of feeding a fusible electrode toward the welding region.

An object of my invention is to provide an improved machine which is simple in construction, sensitive in its response to arc conditions and positive in its action.

A further object of my invention is to provide a method of, and apparatus for, obtaining a smooth, unpitted surface of deposited arc metal opposite the fusible electrode upon interrupting the arc.

In practicing my invention, I provide a step-by-step electrode-feeding mechanism operating in response to arc fluctuations of the type disclosed in my copending application, Serial No. 716,290, filed May 28, 1924, assigned to the Westinghouse Electric and Manufacturing Company.

In the copending application just mentioned, I have disclosed and broadly claimed an arrangement that comprises a pair of feed rolls, between which the electrode is held, and a motor that is operatively connected to the feed rolls through a pawl-and-ratchet mechanism which is caused to operate in response to fluctuations in the arc voltage.

In my copending application, relay mechanism is shown, responsive to the voltage of the arc, to cause the engagement or the disengagement of corresponding pawls and ratchet wheels operating respectively to feed and to retract the fusible electrode. The engagement of a given pawl and its associated ratchet is caused by the energization of a corresponding solenoid connected in one of the relay contact circuits. Under the condition when neither solenoid is energized, both pawls are disengaged from their respective ratchets. With both pawls disengaged or floating, a slight retraction of the fusible electrode is possible because of the tension that is placed thereon by the unwinding of the electrode wire from its reel. Any movement of the wire may be prevented, however, by increasing the frictional pressure on the feed rolls.

In the automatic welding machines of the prior art, as well as in the machine shown in my copending application, the arc is interrupted at the end of the electrode travel merely by quickly opening the arc circuit. As a result, current flow ceases abruptly, and the molten metal deposited immediately prior to the interruption of the arc solidifies in a characteristic crater-like form while exposed to the action of atmospheric gases. The surface of this crater or depression thereupon assumes a pitted or oxidized character which is objectionable because of its appearance and also because of a possible weakening of the deposited metal.

In my present invention, the possibility of a non-positive or floating condition of the pawls has been avoided by causing the said pawls to engage their respective ratchets when their associated electromagnets are deenergized.

I have also provided a simple means for preventing the formation of the crater-like depression, as well as the excessive oxidation of the deposited metal, at the interruption of the arc, by causing the arc current or arc energy to be progressively decreased, thus gradually decreasing the rate of deposit of the metal while maintaining an envelope of arc-generated gases about the deposit to exclude atmospheric gases during the congealing period.

Figure 2:
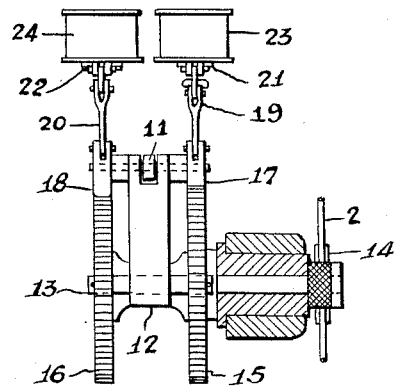

With the foregoing and other objects in view, my invention consists in the details of construction and methods of operation hereinafter described and claimed, and illustrated in the accompanying drawing, wherein Fig. 1 is a diagrammatic view, partly in vertical section, showing circuits and apparatus embodying my invention in a preferred form, and Fig. 2 is an end view of the electrode-feeding ratchets, pawls and solenoids.

In the embodiment of my invention shown in the drawing, an electrode-feeding head 1 is provided for feeding a metallic wire electrode 2 to or from the work 3 to be welded, an arc 4 being maintained between the electrode and the work by means of an arc supply circuit 5, 6, as is well understood in the art.

The electrode-feeding head 1, of my invention, comprises a housing 7 within which is mounted an electric motor 8 which is mechanically connected, through reduction gearing 9, to an eccentric 10. A reciprocating motion is imparted by the eccentric to a connecting rod 11 which oscillates a lever arm 12 loosely mounted on a shaft 13 carrying a feeding roller 14 which frictionally engages the electrode 2.

The feeding roller 14 is driven by means of a feeding ratchet 15 and a retracting ratchet 16, both of which are fixed to the shaft of the feeding roller. The ratchets 15 and 16 are engaged by oppositely directed pawls 17 and 18 which are carried by the oscillating lever arm 12 actuated by the reciprocating eccentric rod 11.

The pawls 17 and 18 are actuated by links 19 and 20 which are connected, respectively, to two hinged armatures 21 and 22 of electromagnets 23 and 24. The pawls are normally held in engagement with the ratchet wheels by springs 25 and 26 attached to the hinged armatures.

The electromagnet 23 is energized, from an auxiliary source of electrical energy 27, through contact members 28 and 29 of an arc-voltage-responsive relay 30. The electromagnet 24 is similarly energized, from the auxiliary energy source 27, through contact members 33 and 34 of the same relay 30.

The arc-voltage-responsive relay 30 comprises a solenoid 35 adapted to lift a core 36 which carries the movable switch contact members 29 and 33. One terminal of the relay solenoid 35 is connected to an arc-energy supply lead 5 which is electrically connected to the housing 7. The other terminal of the relay solenoid is connected, through a disconnecting switch 38 and a rheostat 39 to the other arc-supply lead 6 which is grounded on the work 3 to be welded.

In operation, the arc-voltage-responsive relay 30 is set to close the upper pair of contacts 33, 34 when the arc voltage rises to any desired value, for example, 15 volts, and to open said upper contacts and close the lower contacts 28, 29 when the arc voltage drops to some smaller value, as 14 volts, the disconnecting switch 38 being closed.

The voltage to which the relay 30 responds may be varied by altering the setting of the relay rheostat 39.

When the welding circuit 5, 6 is first energized, the open-circuit voltage across the gap between the separated electrodes 2 and 3, being in excess of 15 volts and being also applied to the terminals of the relay 30, energizes the relay coil 35 and causes the relay core 36 to be drawn upwardly, opening the lower relay contacts 28, 29 and closing the upper contacts 33, 34 which are in circuit with the electromagnet 24. The resulting energization of the magnet 24 causes the hinged armature 22 thereof to be drawn upwardly, thus disengaging the retracting pawl 18 from its ratchet wheel 16.

The motor 8, having previously been set in operation, causes a rapid reciprocation of the eccentric arm 11 and of the pawls 17 and 18. In the illustrated embodiment of my invention, the eccentric rod reciprocates over a distance of about 3/16" in about one-twelfth of a second. The rate of movement of the pawls is, therefore, so rapid that, if the feeding pawl 17 were in continuous operation, the rate of electrode-feed would greatly exceed the melting rate of the electrode.

Upon the disengagement of the retracting pawl 18, immediately following the energization of the welding circuit 5, 6, the continuous reciprocation of the feeding pawl 17, engaging the teeth of the ratchet wheel 15, causes the electrode 2 to be fed towards the work until it is in substantial contact therewith and thereby establishes a current in the electrode circuit.

With the closing of the electrode gap, the potential applied to the relay coil 35 immediately falls below 14 volts, causing the relay core 36 to drop. The upper relay contacts 33, 34 are thus separated, deenergizing the magnet 24 and causing the re-engagement of the retracting pawl 18 with the ratchet wheel 16. At about the same time, the lower relay contacts 28, 29 are closed, thus energizing the magnet 23 and causing its armature 21 to disengage the feeding pawl 17 from its rachet wheel 15.

By reason of the slight inductance and small weights of the parts involved in my control system, the magnetic and mechanical time lags thereof are of a negligible order, so that an almost immediate engagement or disengagement of the ratchet-actuating pawls is secured in response to changes in the arc voltage.

To provide against any incidental retraction of the electrode by reason of the tension placed thereon by the reel (not shown), the friction between the electrode 2 and the feed roller 14 may be increased by varying the adjustment of an idler pressure roller 40, in a manner well known in the art.

After contact has been made between the electrode 2 and the work 3, the feeding pawl 17 is immediately disengaged, leaving the retracting pawl free to withdraw the electrode and thus strike a welding arc. If partial fusion or sticking should occur, as a result of the initial contacting of the electrode, any resistance to separation is readily overcome by the impacts of the reciprocating members on the ratchet teeth of the retracting wheel 16.

The retracting pawl 18 continues to separate the electrodes and thus lengthen the arc until the arc potential is about 15 volts, whereupon the relay coil 35 is energized with sufficient force to cause its core to break the lower set of contacts 28, 29 and close the upper set 33, 34, thus causing the disengagement of the retracting pawl 18 from its wheel 16 and the re-engagement of the feeding pawl 17 with its wheel 15.

When the arc becomes too short, or when its potential falls below 14 volts, the retracting pawl and ratchet mechanism 18 and 16 again operate to retract the electrode. These actions take place in rapid succession and in variable order, the net result being that the arc length and the arc voltage are maintained sufficiently constant for good welding, while the impacts of the reciprocating mechanism on the electrode-gripping means facilitates a regular or continuous metal transfer by jarring the molten globules from the terminal of the fusible electrode 2.

In my preferred structure, the response of the electrode feeding and retracting mechanism to changes in arc conditions has been made so rapid that the electrode is being either advanced or withdrawn from the work at each instant. However, by employing a sluggish relay having wide voltage settings, a condition may be obtained, during the interval between the breaking of one set of relay contacts and the making of the other set, wherein the electrode is substantially stationary for a short period, except for a slight reciprocation of about 1/32", caused by the alternate impacts of the two pawls 17 and 18 engaging their respective ratchet wheels.

To discontinue the welding operation, the disconnecting switch 38 in the circuit of the relay 30 is opened. The relay coil 35, being deenergized, causes the lower contacts 28, 29 to close, thereby disengaging the feeding pawl 17 from its ratchet wheel. Since the magnet 24 is now deenergized, the retracting pawl 18 remains in engagement with its ratchet wheel and operates to automatically and progressively separate the electrodes, or lengthen the arc, until the arc stream becomes unstable and is extinguished.

As the unstable arc length and arc voltages are considerably in excess of the operating arc length and arc voltage, the effect of separating the electrodes is to gradually decrease the concentration of arc energy on the work terminal, which follows as a result of the decrease in the welding current and the increase in the disturbing effects of convection currents on the arc stream and terminals. A result of the progressive withdrawal of the electrode is, therefore, to reduce or eliminate the hereinabove-mentioned crater formation, by decreasing and distributing the arc energy at the work terminal while permitting the metal to be deposited from the wire electrode. Another result of the progressive withdrawal of the electrode is to reduce the oxidation or pitting of the deposited metal by enveloping the metal with a protecting atmosphere of arc-generated gases.

If desired, the disconnecting switch 38 may be a double-pole switch which may be utilized to insert a current-reducing impedance 42 into the welding circuit 5, 6, simultaneously with the de-energization of the control relay 30, so that the welding current is reduced to about one-third of its normal value before the arc is drawn out by the continuous operation of the retracting mechanism 18, 16.

While I have illustrated my invention in a preferred form, I do not desire to be restricted thereto except as set forth in the appended claims when read in the light of the prior art.

I claim as my invention:

1. An electric arc device comprising a consumable electrode, a continuously operating reciprocating power mechanism, a feeding roller in engagement with said electrode, a ratchet mechanism associated with said feeding roller, a pair of oppositely directed pawls secured to said reciprocating mechanism and yieldably engaging said ratchet mechanism, and electro-responsive means for disengaging but one of the respective pawls at a time from said ratchet mechanism in accordance with the condition of the arc.

2. An electric arc device comprising a consumable electrode, a continuously operating reciprocating power mechanism, a feeding roller in engagement with said electrode, a ratchet mechanism associated with said feeding roller, a pair of oppositely directed pawls secured to said reciprocating mechanism and yieldably engaging said ratchet mechanism, and disconnecting means for continuously disengaging one of said pawls from the said ratchet mechanism independently of arc conditions.

3. An electric arc device comprising a consumable electrode, a feeding mechanism adapted, when energized, to feed said electrode toward the work in a succession of short intermittent steps, retracting mechanism adapted, when energized, to move said electrode away from the work in a succession of short, intermittent steps, electro-responsive means for energizing said feeding and retracting mechanisms in accordance with conditions in the arc circuit, and disconnecting means for rendering only said retracting mechanism continuously operative independent of conditions in the said arc circuit.

4. In an electric arc device, the combination with a consumable electrode, of a work electrode, a feeding mechanism, said feeding mechanism being adapted, when energized, to feed said consumable electrode toward the work, means for retracting said electrode, and means for rendering said feeding mechanism inoperative and said retracting means operative during the remainder of the welding operation whereby the arc will be gradually lengthened until it is extinguished while progressively retracting the said electrode.

5. An arc welding system including a fusible metal electrode, means for feeding the same to the work comprising a substantially constant-speed-motor device, a ratchet mechanism operatively connected to said electrode, a pair of oppositely directed pawls normally in engagement with said ratchet mechanism, an eccentric and rod connecting said motor device and pawls for reciprocating the latter, and means for causing but one of said pawls to be disengaged from said rachet mechanism.

6. An electric-arc device comprising a consumable electrode, a work electrode, means for maintaining an arc therebetween, feeding mechanism normally operative to feed said electrode toward the work in a succession of short, intermittent steps, retracting mechanism normally operative to withdraw said electrode from the work in a succession of short, intermittent steps alternating with said first-mentioned steps, electro-responsive means operative, when the arc length is excessive, to render said retracting mechanism inoperative, and electro-responsive means operative, when the arc length is insufficient, to render said feeding mechanism inoperative.

7. An electric arc device comprising a consumable electrode, a work electrode, means for maintaining an arc therebetween, feeding mechanism normally operative to feed said electrode toward the work in a succession of short, intermittent steps, retracting mechanism normally operative to withdraw said electrode from the work in a succession of short, intermittent steps alternating with said first-mentioned steps, electro-responsive means operative, when the arc length is excessive, to render said retracting mechanism inoperative, electro-responsive means operative, when the arc length is insufficient, to render said feeding mechanism inoperative, and means for continuously rendering said feeding mechanism inoperative for the purpose of drawing out the arc.

8. An electric arc device comprising a consumable electrode, a work electrode, means for maintaing an arc therebetween, feeding mechanism normally operative to feed said electrode toward the work in a succession of short, intermittent steps, retracting mechanism normally operative to withdraw said electrode from the work in a succession of short, intermittent steps alternating with said first-mentioned steps, electro-responsive means operative, when the arc length is excessive, to render said retracting mechanism inoperative, electro-responsive means operative, when the arc length is insufficient, to render said feeding mechanism inoperative, and means for reducing the welding current and continuously rendering said feeding mechanism inoperative at times.

9. An electric arc device comprising a consumable electrode, a work electrode, means for maintaining an arc therebetween, and means for reducing the welding current and subsequently causing said electrode to be withdrawn from the arc in order to discontinue the welding operation.

10. An automatic electric arc welding device for depositing a strip of molten metal from a metallic electrode upon the work, characterized by pulsatory feeding and retracting mechanism normally operative to continuously jar said electrode in a direction substantially co-axial with the arc during the deposition of the metal.

11. An automatic electric arc welding device for depositing a strip of molten metal from a metallic electrode upon the work, characterized by pulsatory feeding and retracting mechanism normally operative to continuously jar said electrode in a direction substantially co-axial with the arc during the deposition of the metal, and means responsive to an arc characteristic for causing said mechanism to feed the electrode toward the work as the former is consumed.

12. An automatic electric arc welding device for depositing a strip of molten metal from a metallic electrode upon the work, characterized by pulsatory feeding and retracting mechanism normally operative to continuously jar said electrode in a direction substantially co-axial with the arc during the deposition of the metal, and means responsive to an arc characteristic for causing said mechanism to feed the electrode toward the work in a succession of short, quick discontinuous steps.

13. An electric-arc device comprising a consumable electrode, a work electrode, pulsatory feeding mechanism normally operative to feed the consumable electrode in a series of short intermittent steps, pulsatory retracting mechanism normally operative to withdraw the consumable electrode in a series of short intermittent steps and means responsive to arc conditions for causing either the feeding or the retracting action to dominate.

In testimony whereof, I have hereunto subscribed my name this 14th day of May, 1926.

ALLIS M. MacFARLAND.